United States Patent [19]

Haas, Sr. et al.

[11] 4,303,690

[45] Dec. 1, 1981

[54] PROCESS FOR MANUFACTURING THIN-WALLED, HOLLOW PASTRY ARTICLES

[76] Inventors: Franz Haas, Sr., Gerstlgasse 25; Franz Haas, Jr., Deublergasse 29, both of Vienna, Austria, 1210; Johann Haas, 209 Wiener Strasse, Spillern, Austria, 2104

[21] Appl. No.: 47,822

[22] Filed: Jun. 12, 1979

Related U.S. Application Data

[63] Continuation of Ser. No. 835,683, Sep. 22, 1977, abandoned.

[30] Foreign Application Priority Data

Sep. 30, 1976 [AT] Austria ................................ 7258/76

[51] Int. Cl.$^3$ .......................... A21D 2/10; A21D 8/08; A21D 10/00
[52] U.S. Cl. ...................................... 426/549; 99/383; 99/428; 425/412; 426/280; 426/391; 426/403; 426/499; 426/504; 426/505; 426/514; 426/523
[58] Field of Search ............... 426/280, 549, 550, 391, 426/443, 465, 496, 499, 503, 504, 505, 514, 523, 283, 138, 139, 403; 99/383, 428; 425/412; 249/DIG. 1; 264/299, 320, 325

[56] References Cited

U.S. PATENT DOCUMENTS

| | | | |
|---|---|---|---|
| 1,416,889 | 5/1922 | Sharp | 426/391 |
| 1,480,284 | 1/1924 | Mignerey | |
| 1,573,989 | 2/1926 | Muck | 99/383 X |
| 1,759,924 | 5/1930 | Turnbull | |
| 2,069,027 | 1/1937 | Balton | 426/391 |
| 3,290,154 | 12/1966 | Turner | |
| 3,431,869 | 3/1969 | Frank | 426/391 X |
| 3,541,587 | 11/1970 | Washburn | 426/138 X |
| 3,617,304 | 11/1971 | Rahm | 426/280 X |

FOREIGN PATENT DOCUMENTS

| | | |
|---|---|---|
| 410248 | 5/1968 | Australia . |
| 240309 | 5/1965 | Austria . |
| 445903 | 4/1936 | United Kingdom . |
| 1042957 | 9/1966 | United Kingdom . |
| 1342880 | 1/1974 | United Kingdom . |

*Primary Examiner*—Arthur L. Corbin
*Attorney, Agent, or Firm*—Kenway & Jenney

[57] ABSTRACT

A process for manufacturing hollow, thin-walled pastry articles, particularly cone shaped waffles, wherein a kneadable, firm dough body is conveyed to a plurality of baking molds of a cone baking apparatus, each baking mold consisting of a matrix and a patrix, the dough body being delivered into each matrix. The patrix or core of the mold is lowered into the matrix to distribute the dough body over the matrix wall, and is raised again to allow the escape of air and vapor developed by the dough body during baking. The lowering and raising operation of the patrix core is repeated several times and the patrix core remains in the lowered and raised position at varying intervals. The patrix is finally locked on the mold and after final baking the mold is opened and the finished hollow, cone shaped waffle is released.

8 Claims, No Drawings

PROCESS FOR MANUFACTURING THIN-WALLED, HOLLOW PASTRY ARTICLES

This is a continuation, of application Ser. No. 835,683, filed Sept. 22, 1977, now abandoned.

The invention relates to a process for manufacturing thin-walled hollow pastry articles, particularly waffle cones, cups, bowls and plates, during which the waffle dough is introduced into the matrix of a baking mold, thereafter the mold core or patrix is closed over the matrix to distribute thd dough in the mold, and the dough is finally baked in the substantially closed baking mold.

It is particularly important for the food freezing industry to have available thin-walled hollow waffle articles, for example waffle cones, with a high resistance against soaking and softening due to the inherent moisture of the filler material contained in the hollow waffle article. A decisive factor in the resistance of the hollow waffle article is its sugar content or its specific weight. With respect to the sugar content this resistance is based on the fact that during the baking process the sugar fuses at least in the outer layers and thus brings about the formation of a compact mass which presents no air pockets in the form of bubbles. A hollow waffle article with a high sugar content has also a higher specific weight, as with increasing sugar content the pores in the baking material become smaller.

The prior art discloses already baking devices for hollow waffle cones, for example in Austrian Pat. No. 240 309, in which the cones are produced during a single manufacturing process in baking forms which consist of a matrix and a patrix. In this process a fluid dough of a consistency that can still be injected is filled into the matrix and is distributed over the entire hollow space of the mold by the patrix.

It is also generally known that the specific weight depends to a large extent on the driving force of the vapors and gases which are generated in the dough during the baking process. The fewer of these vapors and gases that are allowed to escape during the baking process the looser and thus lighter will be the waffle cone. In this connection it is to be noted also that excessively high driving forces within the fluid dough during the baking process may lead to a sticking of the finished waffle cone to the baking mold so that there exists a danger of breaking the waffle cone during removal from the baking mold. This sticking property of the finished waffle cone to the baking mold is increased further by the sticking effect of the sugar contained in the dough which is fused to a caramel-like condition during the baking process.

It would be basically possible to manufacture in such a baking apparatus waffle cones of a higher specific weight from a fluid dough. However, in that case the gas discharge process would have to be stretched over a longer period of time. This presents difficulties. An extension of the gas discharge process brings about an extension of the baking time which in turn requires a reduction of the temperature of the baking mold as otherwise the waffle cones would become too dark at the surface and have an unpleasing appearance. Another result would be that the output of the baking apparatus would be substantially reduced or the baking apparatus would have to be constructed much larger to obtain the same output. This would bring about an increase of the cost for the waffle cones such that this type of baking apparatus could not be sold. Furthermore the sugar content could not be increased as due to the longer baking time the sticking effect of the fused sugar would be too great.

For all these reasons it has therefore not been possible to produce economically in the known baking apparatus waffle cones with a high specific weight or waffle cones having a sugar content of more than 25%.

Waffle cones having a sugar content of more than 25% are produced hitherto by first baking a flat waffle leaf between two baking plates, wherein the baking plates have no vapor retaining elements of any kind so that the waffle leaf can readily lose the gases through the gap between the baking plates and for this reason alone presents already a higher specific weight. This fully baked out flat waffle leaf is rolled while still soft in a separate device to form a cone. It is clear that this manufacture of waffle cones is substantially more time consuming than the manufacture of waffle cones in a single work process as is done in the known waffle cone baking devices. In order to reach the output of a known waffle cone baking apparatus with a corresponding article output of about 10.000 cones per hour it is necessary to use three machines of this other type.

It is an object of the invention to make available a process for the manufacture of thin-walled, hollow waffle articles, particularly waffle cones, by which hollow waffle articles of a higher specific weight and also of a higher sugar content can be manufactured in the known baking apparatus.

This is obtained according to the invention in that the waffle dough is introduced into the baking mold in the form of a firm body of dough which can be kneaded. In this manner first of all the proportion of fluid in the dough which causes the development of vapor and gas during the baking process is kept low and thereby the relative sticking effect of the waffle article in the baking mold is reduced. In this manner it is possible to increase the sugar content without causing the hollow waffle article to stick in the baking mold to such an extent that it would break when removed from the mold.

The process according to the invention makes it possible to produce hollow waffle articles with a sugar content of more than 30%, more particularly between 40% and 60%, as well as with a higher specific weight. Due to the low water proportion of the dough the heat requirement of the baking mold relative to that necessary when using a fluid dough suitable for injecting is substantially smaller in view of the fact that less water must be evaporated. The firm dough body contains preferably, per kg flour, 0.4–0.6 liters water and has the form of a ball, a cylinder, a cube, a truncated cone and the like. According to a preferred embodiment of the process according to the invention the firm dough body has the shape of a hemisphere and is placed into the mold with the semi-spherical side toward the closed end of the mold wherein the flat surface of the hemisphere lies in a plane which is parallel to the plane determined by the edge of the hollow waffle article.

The shape of the firm dough body can be produced either in a known manner in a cake molding machine or in an extrusion press which provides firm cords of dough that are subsequently severed into smaller pieces. It is furthermore possbile to obtain a suitable shape for the firm dough bodies by punching them from a dough strip or by cutting up a dough strip. The baking mold, particularly the cone mold, for carrying out the process of the invention is characterized in that it presents at its closed or bottom end, or in its proximity, one or more vapor canals wherein preferably the one or more vapor canals thus provided are arranged in the separation plane of the matrix. In this way it is guaranteed that also when using a firm dough the lower part of the cone mold is completely filled up because the dough which boils up in the mold may displace the air enclosed in this part of the mold, as well as the vapor that is generated, through this vapor canal. If a vapor canal is not provided the air and vapor which cannot escape or escape only with difficulty through the dough body upwards could prevent the complete filling up of the mold in the lower part which would result in an incomplete hollow waffle article. In the case of a cone mold the vapor canal is advantageously located at the pointed end of the cone.

It is obvious that the process according to the invention may also be used in the manufacture of hollow waffle articles which have a low sugar content.

The process of the invention will be described in greater detail hereafter with reference to a recipe for waffle cones and a cone baking apparatus as described in Austrian Pat. No. 240 309.

1 kg of flour, 400–600 g of sugar and 50–80 g of coconut fat are mixed in a stirring or kneading machine wherein just enough water, (between 0,4–0,6 1 per kg flour) are added in order to obtain a firm, kneadable dough. To improve the taste of the waffle cones about 20 g of egg yolk powder can be added also to the dough, as well as 30–50 g of skim milk powder, and 5 g of salt and baking additive. The dough thus prepared is then shaped into semi-spherical bodies in a known cake molding device whose shaping roll is provided with semi-spherical recesses, and the semi-spherical bodies thus formed are placed via a conveyor belt into the matrix of a known cone baking apparatus. The patrix is thus introduced by means of a pulley and adjustable cams into the matrix to such an extent that the dough body located in the maxtrix is reformed by the core of the patrix so that the dough is distributed substantially over the entire hollow space of the mold due to the volume displacement produced by the patrix core. The core is thereafter slightly raised so that the vapor can escape from the open mold. Thereupon the core is introduced a second time while the mold continues its direction of movement and this time the core remains somewhat longer in the mold so that the dough is baked already lightly at the mold walls. The core is raised again as before to allow evaporation but this time only for a shorter period. This process is repeated a few more times until the dough has reached the upper edge of the mold and the hollow space of the mold has been completely filled up by the dough. After the last oscillation of the core the mold is finally closed by locking the patrix thereon.

When these movements are once programmed and regulated so as to be automatically repeated a compact pastry article can be produced in the mold, and due to the continuous discharge of vapor it is pressed against the mold walls only to a small extent so that practically no sticking occurs.

The removal of the finished cones from the mold is obtained by lifting up the cores and opening the lower two mold halves whereupon the waffle cone drops from the mold.

What is claimed is:

1. A process for manufacturing hollow, thin-walled pastry articles, comprising the steps of:
   preparing a mixture of flour and sugar with at least about 400 grams of sugar per kilogram of flour;
   adding to the mixture an amount of water only sufficient to make a kneadable, firm, shape-holding waffle dough;
   forming a discrete dough body in a definite shape from the prepared waffle dough;
   placing the shaped body of waffle dough on one part of an open baking mold having a hollow part at least partially closed at one end and a core part received in the hollow part;
   bringing the parts of the baking mold together to close the mold around the dough to define the shape of the article;
   baking the dough with the mold closed;
   allowing vapor to escape from the mold at least intermittently while continuing to bake the dough until the article is formed and then;
   opening the mold and removing the article.

2. The process of claim 1, wherein the step of allowing vapor to escape is accomplished by intermittently separating the parts of the mold sufficiently to allow vapor to escape from the mold.

3. The process of claim 2, wherein the step of intermittently separating is accomplished by withdrawing the core part for a first selected interval of time and then reclosing the mold and subsequently repeatedly withdrawing the core part for intervals of time briefer than the first and reclosing the mold following each withdrawal of the core part.

4. The process of claim 1, wherein said dough body is shaped as a rounded mass flattened on one side and is placed flat-side up in the hollow part of the baking mold.

5. The process of claim 1, wherein the dough body is shaped like a hemisphere and placed in the hollow part of the mold with its spherical side toward the at least partially closed end of the hollow part.

6. The process of claim 1, wherein the amount of water added is no more than about 0.6 liters per kilogram of flour before baking.

7. The process of claim 1, wherein the amount of water added is about 0.4 to about 0.6 liters per kilogram of flour before baking.

8. The process of claim 1, wherein vapor is allowed to escape during baking through the at least partially closed end of the hollow part of the mold to insure complete filling of the mold with said waffle dough.

* * * * *